United States Patent
Ahn et al.

(10) Patent No.: US 12,090,715 B2
(45) Date of Patent: Sep. 17, 2024

(54) CAUL PLATES FOR PREFORMS THAT UNDERGO PICK AND PLACEMENT

(71) Applicant: The Boeing Company, Arlington, VA (US)

(72) Inventors: Jonathan Y. Ahn, Seattle, WA (US); Davis Tran, Seattle, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/388,768

(22) Filed: Nov. 10, 2023

(65) Prior Publication Data

US 2024/0075697 A1    Mar. 7, 2024

Related U.S. Application Data

(62) Division of application No. 16/790,409, filed on Feb. 13, 2020, now Pat. No. 11,865,798.

(51) Int. Cl.
| B29C 70/84 | (2006.01) |
| B29C 43/36 | (2006.01) |
| B29C 65/48 | (2006.01) |
| B29C 70/06 | (2006.01) |
| B29C 70/38 | (2006.01) |
| B29C 70/54 | (2006.01) |

(52) U.S. Cl.
CPC .......... *B29C 70/84* (2013.01); *B29C 43/3642* (2013.01); *B29C 65/481* (2013.01); *B29C 70/06* (2013.01); *B29C 70/38* (2013.01); *B29C 70/545* (2013.01); *B29C 2043/3655* (2013.01)

(58) Field of Classification Search
None
See application file for complete search history.

(56) References Cited

U.S. PATENT DOCUMENTS

2012/0258276 A1* 10/2012 Modin ................. B29C 70/543
                                                         156/443

* cited by examiner

*Primary Examiner* — Jacob T Minskey
*Assistant Examiner* — Caroline Beha
(74) *Attorney, Agent, or Firm* — Duft & Bornsen, PC

(57) ABSTRACT

Systems and methods are provided for facilitating pick and placement of preforms. One embodiment is a method for picking and placing a preform. The method includes placing an inner surface of a first caul plate into contact with a first side of a stringer preform, such that an outer surface of the first caul plate forms a first plane that is uniform along a length of the stringer preform, placing an inner surface of a second caul plate into contact with a second side of the stringer preform, such that an outer surface of the second caul plate forms a second plane that is parallel to the first plane along a length of the stringer preform, grasping the caul plates at the first plane and the second plane along the length of the stringer preform, and lifting the stringer preform together with the caul plates while maintaining the grasp.

20 Claims, 18 Drawing Sheets

CAUL PLATES FOR PREFORMS THAT UNDERGO PICK AND PLACEMENT

RELATED APPLICATIONS

This patent application is a divisional of co-pending U.S. patent application Ser. No. 16/790,409, filed on Feb. 13, 2020, which is hereby incorporated by reference in its entirety.

FIELD

The disclosure relates to the field of fabrication, and in particular, to fabrication of composite parts.

BACKGROUND

Multi-layer preforms of constituent material (e.g., Carbon Fiber Reinforced Polymer (CFRP)) may be formed into any of a variety of shapes for curing into a composite part. These shapes may include complex contoured features. For example, a preform for a wing stringer may be designed to exhibit twists and bends along multiple axes. These twists and bends complicate the process of picking up and placing the preform onto a preform for a skin panel for a wing, because the location and angle at which the stringer should be grasped varies substantially along its length. To accommodate these complicated geometries, current Pick-and-Place (PNP) machines utilize a large number of gripping elements that are each capable of rotation and translation with respect to multiple axes. These gripping elements require complex software to manage and coordinate work performed during a single pick and placement operation. These issues are magnified when the PNP machines are used to pick and place multiple stringer preforms for multiple wings.

Therefore, it would be desirable to have a method and apparatus that take into account at least some of the issues discussed above, as well as other possible issues.

SUMMARY

Embodiments described herein provide for enhanced adapters (e.g., caul plates) which are picked up and placed along with preforms for stringers. The adapters exhibit variations in geometry wherein their inner surfaces are complementary to a stringer preform, while their outer surfaces form a common plane across a length (e.g., an entire length, or a portion thereof) of the stringer preform. Thus, from the perspective of a PNP machine, the piece being picked up (i.e., the caul plates in combination with the stringer preform) exhibits the same pinch angle and the same pinch width across its entire length. This provides a technical benefit by enabling a reduction in the complexity of PNP machinery end effectors/grippers (as well control programs pertaining thereto).

One embodiment is a method for picking and placing a preform. The method includes placing an inner surface of a first caul plate into contact with a first side of a stringer preform, such that an outer surface of the first caul plate forms a first plane that is uniform along a length of the stringer preform, placing an inner surface of a second caul plate into contact with a second side of the stringer preform, such that an outer surface of the second caul plate forms a second plane that is parallel to the first plane along a length of the stringer preform, grasping the caul plates at the first plane and the second plane along said length of the stringer preform, and lifting the stringer preform together with the caul plates while maintaining the grasp.

A further embodiment is a method for fabricating caul plates for a preform. The method includes laying up additional layers of fiber reinforced material atop a stringer preform that follow a shape of the stringer preform, hardening at least a portion of the additional layers into a first caul plate having an inner surface that is complementary to a first side of the stringer preform defined by a first flange and a web of the stringer preform, the first caul plate further having an outer surface, and machining the outer surface of the first caul plate to form a first plane that is uniform along a length of the stringer preform.

A still further embodiment is a system in the form of caul plates for a stringer preform. The system includes a first caul plate, comprising a body defining an inner surface that is complementary to a first side of the stringer preform defined by a first flange and a web of the stringer preform, and an outer surface that defines a first plane that is uniform along a length of the stringer preform. The system further includes a second caul plate, comprising a body defining an inner surface that is complementary to a second side of the stringer preform defined by a second flange and the web of the stringer preform, and an outer surface that defines a second plane that is parallel to the first plane along the length of the stringer preform.

A still further embodiment is a system for supporting a stringer preform. The system includes a first series of adapters, each adapter comprising a body defining: an inner surface that is complementary to a first side of the stringer preform defined by a first flange and a web of the stringer preform, and an outer surface that is coincident with a first plane. The system further includes a second series of adapters, each adapter comprising a body defining: an inner surface that is complementary to a second side of the stringer defined by a second flange and the web of the stringer preform, and an outer surface that is coincident with a second plane that is parallel with the first plane.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

The stringer preforms and wing skin panels discussed herein comprise composite parts in one or more embodiments. Composite parts, such as Carbon Fiber Reinforced Polymer (CFRP) parts, are initially laid-up in multiple layers that together are referred to as a preform. Individual fibers within each layer of the preform are aligned parallel with each other, but different layers exhibit different fiber orientations in order to increase the strength of the resulting composite part along different dimensions. The preform includes a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber is infused with resin prior to hardening. For thermoset resins, the hardening is a one-way process referred to as curing, while for thermoplastic resins, the resin reaches a viscous form if it is re-heated, after which it can be consolidated to a desired shape and solidified. As used herein, the umbrella term for the process of transitioning a preform to a final hardened shape (i.e., transitioning a preform into a composite part) is referred to as "hardening," and this term encompasses both the curing of thermoset preforms and the forming/solidifying of thermoplastic preforms into a final desired shape.

Figure 1:
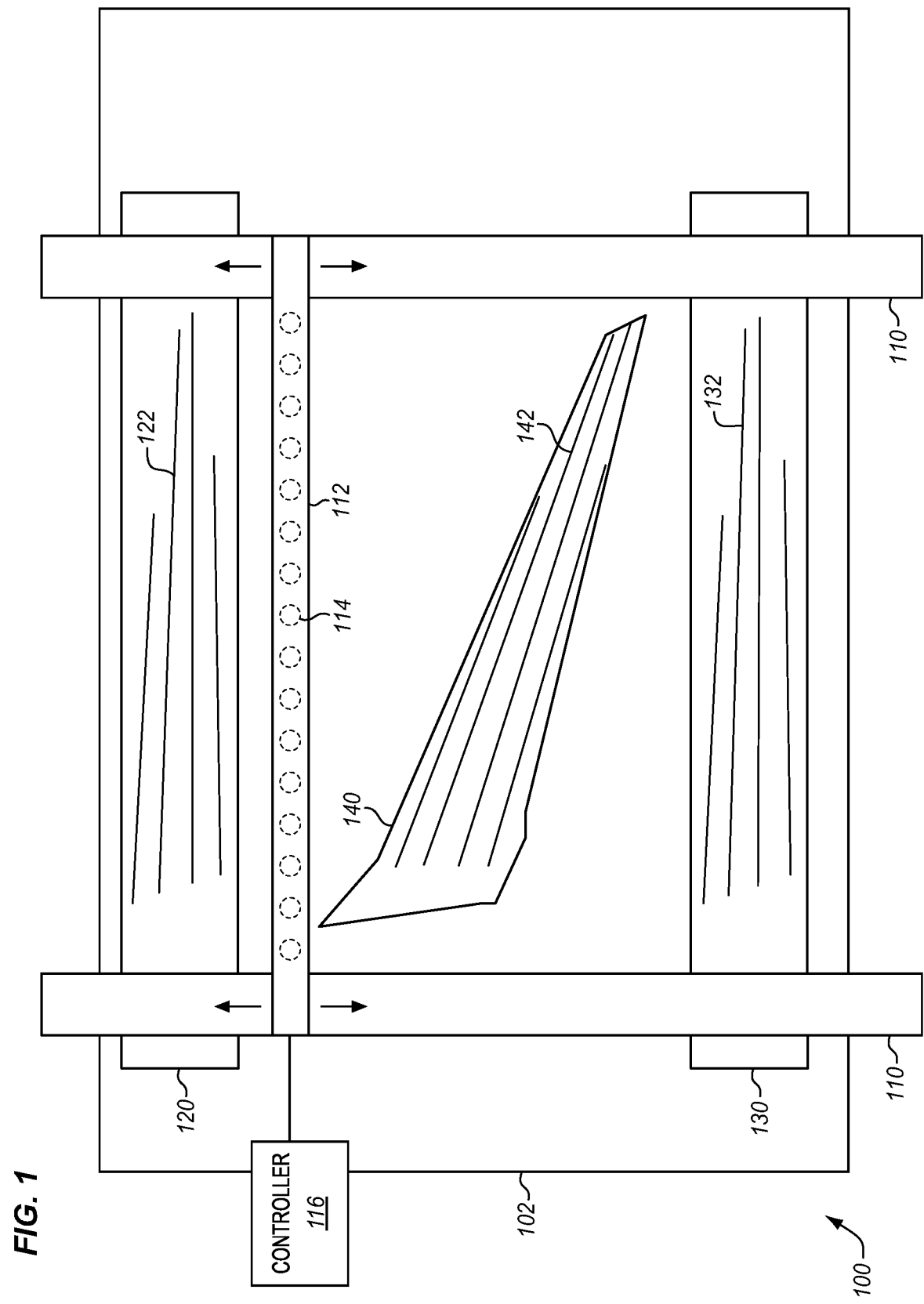
FIG. 1 illustrates a Pick-and-Place (PNP) system for a preform for a portion of a wing of an aircraft in an illustrative embodiment.

FIG. 1 illustrates a PNP system 100 for a preform for a portion of a wing of an aircraft in an illustrative embodiment. In this embodiment, PNP system 100 comprises a work space 102, in which a stringer preform queue 130, caul plate storage 120, and wing panel preform 140 are disposed. A PNP machine 112 operates along gantry 110 to pick up caul plates 122, place the caul plates 122 onto stringer preforms 132, and then pick up and place the stringer preforms 132 together with caul plates 122 onto wing panel preform 140 at placement locations 142. The stringer preforms 132 discussed herein can comprise preforms that extend for tens of feet in length, and PNP machine 112 operates end effectors 114 (e.g., grippers/pinchers, suction elements, etc.) to grasp objects being picked up and placed. While the caul plates 122 are illustrated as being the same length as corresponding stringer preforms 132, in further embodiments the caul plates 122 are shorter than their corresponding stringer preforms. In still further embodiments, multiple sets of caul plates shorter than a corresponding stringer preform are placed at different locations along the length of the stringer preform, and are utilized synchronously to pick up and place the stringer preform. Each pair of the caul plates forms a set of parallel exterior planes for gripping, and the planes may also be parallel across the different pairs of caul plates. The end effectors 114 are separated from each other by desired distances along the length of the PNP machine 112.

While in operation, PNP system 100 picks up stringer preforms 132 together with caul plates 122 that contact the stringer preforms 132. Because the caul plates 122 are rigid, they enforce desired shapes onto the stringer preforms 132 during transport. Furthermore, the caul plates 122 are dimensioned such that a pinch angle (i.e., angle of orientation of an end effector) and/or a pinch width (i.e., distance between gripping components while gripping) is constant for each end effector 114 at the PNP machine 112. This removes the need for a variety of actuators at each end effector 114 (e.g., those used for complex rotations), which simplifies the process of picking up and placing the stringer preform 132 onto the wing panel preform 140. This also reduces the difficulty of synchronizing operations between end effectors 114.

The operations of the PNP machine 112 are directed by controller 116 (e.g., based on instructions for a Numerical Control (NC) program stored in memory). In one embodiment, controller 116 is implemented as custom circuitry, as a hardware processor executing programmed instructions stored in memory, or some combination thereof. With a discussion provided above regarding an overall system architecture, the following discussion focuses on an individual stringer preform.

Figure 2:
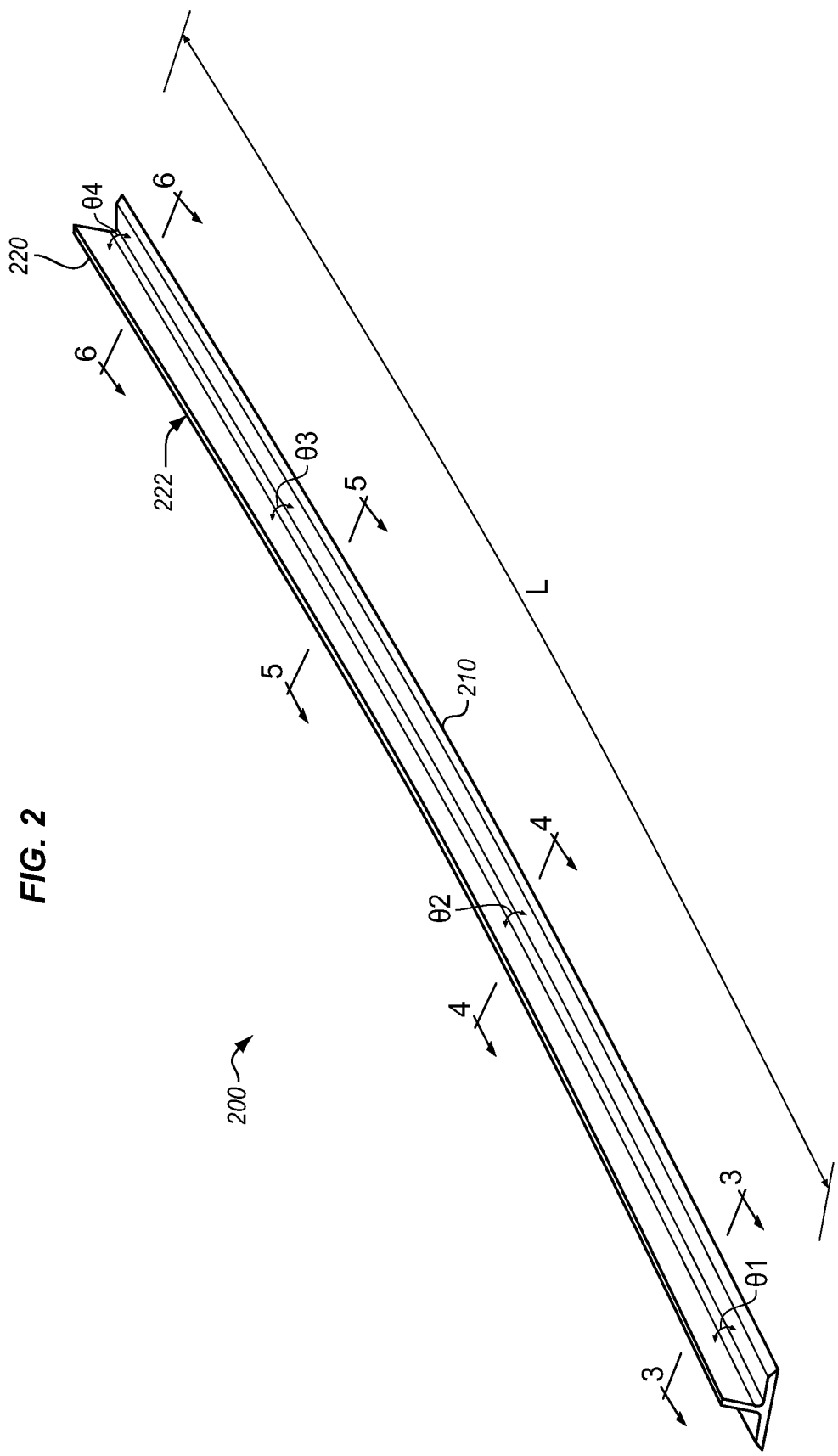
FIG. 2 is a view of a stringer preform for a wing in an illustrative embodiment.

FIG. 2 is a view of a stringer preform 200 for a wing in an illustrative embodiment. In this embodiment, the stringer preform 200 exhibits a complex curvature that follows a curved contour 222. Furthermore, web 220 of the stringer preform 200 varies in angle of extension. As depicted in this example, the angle of the web 220 is θ1 at a first location, θ2 at a second location, θ3 at a third location, and θ4 at a fourth location. This means that different end effectors attempting to grip the web 220 along the length L of the stringer preform 200 must adjust their pinch angle relative to each other, which is a complex process that involves coordinating the action of tens or hundreds of motors that drive the end effectors. With a discussion provided above regarding a stringer preform, the following discussion focuses on geometry of portions of the individual stringer preform.

Figure 3:
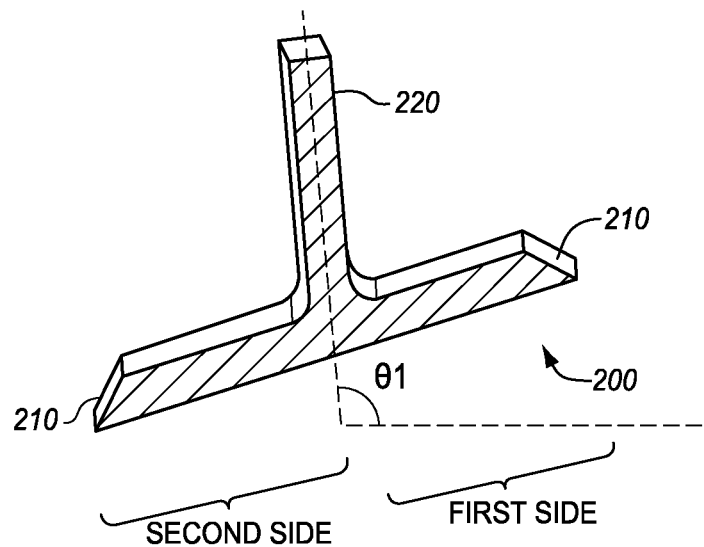
FIGS. 3-6 are cut views of a front of the preform of FIG. 2 in an illustrative embodiment.
Figure 4:
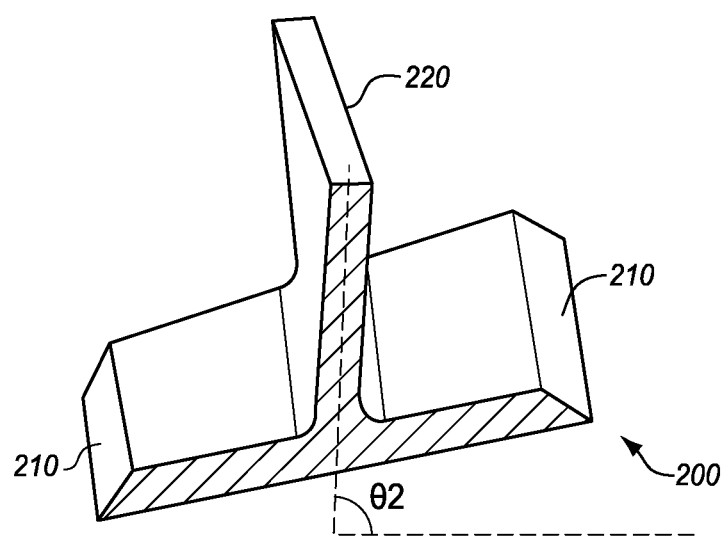
Figure 5:
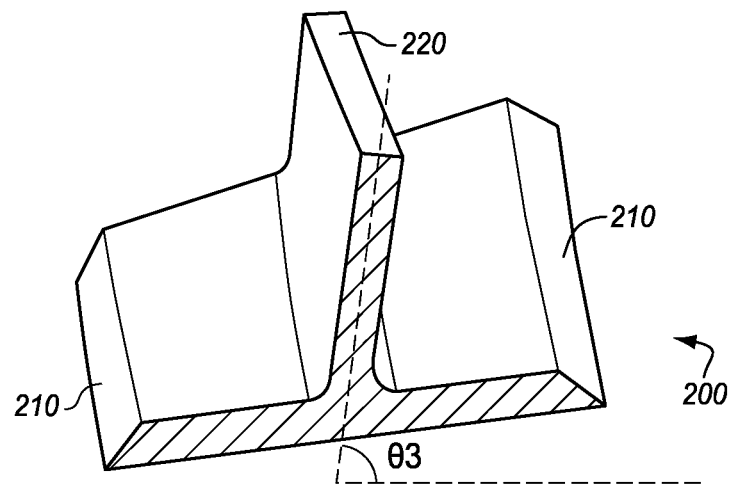
Figure 6:
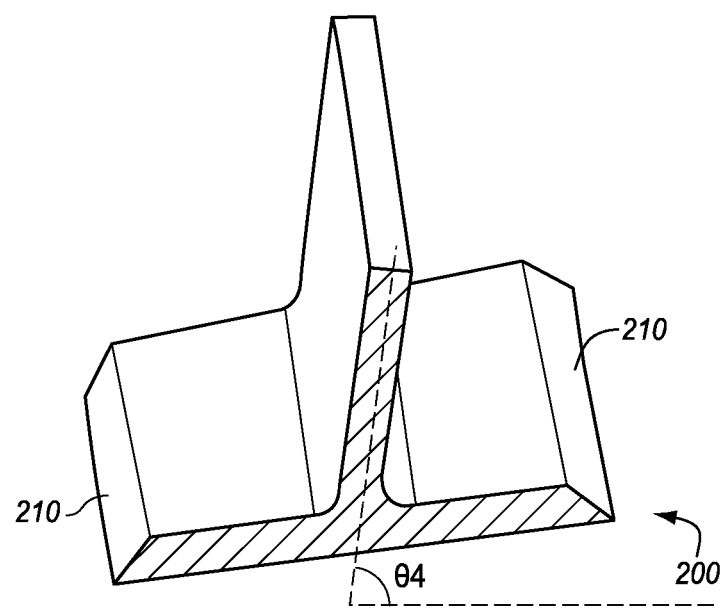

FIGS. 3-6 are cut views of a front of the preform of FIG. 2 in an illustrative embodiment. Specifically, FIG. 3 illustrates a section cut corresponding with view arrows 3 of FIG. 2, and illustrates θ1 for the web 220 at a first position along the length of the stringer preform 200. In FIG. 3, the stringer preform 200 is depicted as including a first side defined by a flange 210 and a web 220, as well as a second side defined by a flange 210 and the web 220. FIG. 4 illustrates a section cut corresponding with view arrows 4 of FIG. 2, and illustrates θ2 for the web 220 at a second position along the length of the stringer preform 200. FIG. 5 illustrates a section cut corresponding with view arrows 5 of FIG. 2, and illustrates θ3 for the web 220 at a third position along the length of the stringer preform 200. FIG. 6 illustrates a section cut corresponding with view arrows 6 of FIG. 2, and illustrates θ4 for the web 220 at a fourth position along the length of the stringer preform 200.

To address the complexities in the design of the stringer preform 200 in a manner that facilitates pickup and placement of the stringer preform 200, enhanced caul plates are provided which provide a uniform pair of planes for picking up the stringer preform 200 (together with the caul plates themselves). In this arrangement, the orientation of each end effector at a PNP machine need not be independently adjusted based on its position along the length of the stringer preform 200. With a stringer preform now having been fully discussed, details of caul plates for a stringer preform are provided below.

Figure 7:
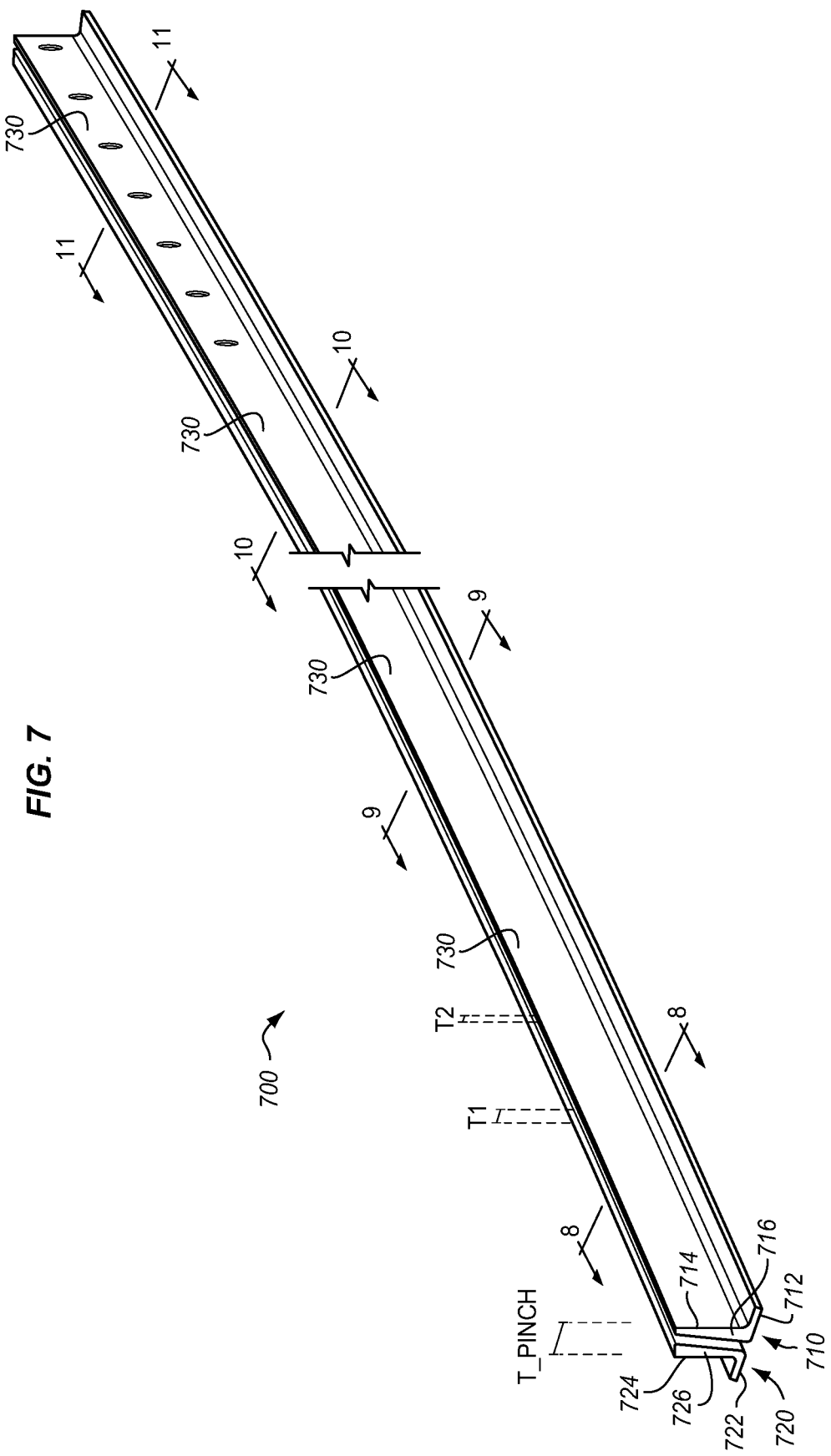
FIG. 7 is a perspective view of caul plates for a stringer preform in an illustrative embodiment.

FIG. 7 is a perspective view 700 of caul plates 710 and 720 for a stringer preform in an illustrative embodiment. As depicted herein, caul plate 710 includes a body 716 that defines a flange 712 and a web 714, while caul plate 720 includes a body 726 that defines a flange 722 and a web 724. The caul plates are complementary to the geometry of the stringer preform 200, enabling them to be placed flat against the stringer preform 200. At the same time, outer surfaces of the caul plates form parallel planes that are separated by a distance T_PINCH which remains constant, even as a thickness T2 of caul plate 710, and a thickness T1 of caul plate 720 varies. T_PINCH is equal to T1 plus T2 plus a thickness of a web of a stringer between the caul plates. The constant thickness enables gripping of locations 730 to be performed at a uniform pinch angle and thickness (although potentially at different depths).

Figure 8:
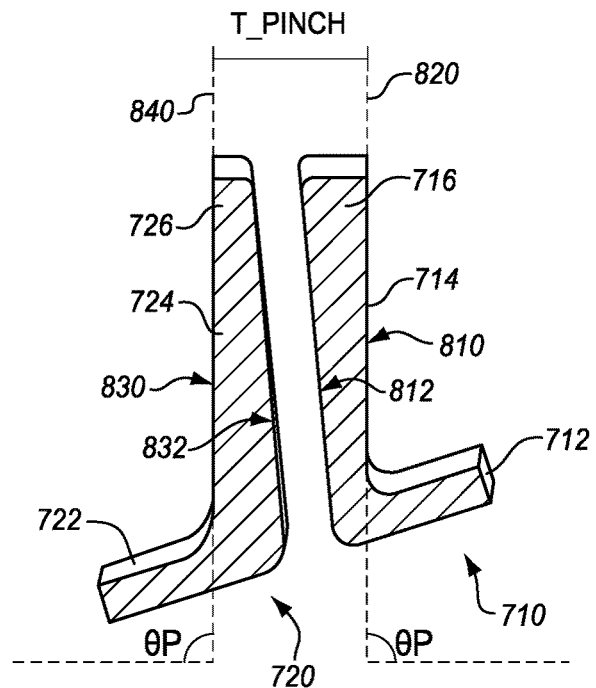
FIGS. 8-11 are section cut views of the caul plates of FIG. 7 in an illustrative embodiment.

FIGS. 8-11 are section cut views of the caul plates of FIG. 7 in an illustrative embodiment. FIG. 8 corresponds with view arrows 8 of FIG. 7. As shown in FIG. 8, body 716 of caul plate 710 defines an inner surface 812 that is complementary to a first side of the stringer preform defined by a flange and a web of the stringer preform. Body 716 further defines an outer surface 810 that defines a first plane 820 that is uniform along a length (e.g., an entire length, a portion thereof, etc.) of the stringer preform. Indeed, in the illustrated embodiment, the plane 820 is uniform along the entire length of the stringer preform. However, in further embodiments the plane 820 is uniform along a length comprising a portion of the entire length of the stringer preform. Body 726 of caul plate 720 defines an inner surface 832 that is complementary to a second side of the stringer preform defined by a flange and the web of the stringer preform. Body 726 further defines an outer surface 830 that defines a second plane 840 that is parallel to the first plane 820 along a length (e.g., an entire length, or a portion thereof) of the stringer preform. The inner surfaces of the caul plate 710 and the caul plate 720 change orientation along the length (e.g., an entire length, or a portion thereof) of the stringer preform (i.e., in order to accommodate changes in stringer geometry), while the outer surfaces of the caul plate 720 and the caul plate 720 maintain the same orientation (i.e., in order to accommodate pick and place operations).

In short, outer surfaces 810 and 830 of the caul plates form a first plane 820 and a second plane 840, which are parallel to each other along a length (e.g., an entire length, or a portion thereof) of the stringer preform. This is the case even though the angle of inner surfaces 812 and 832 are aligned to accommodate changes in the angle of a web of a stringer preform. Furthermore, the second plane 840 is separated from the first plane 820 by a uniform distance (T_PINCH) along the length of the stringer preform, which ensures a uniform pinch width for end effectors that pick up the stringer preform with the caul plates. Phrased another way, the caul plate 710 and the caul plate 720 exhibit a non-uniform thickness. By varying the thickness of the caul plates, uniformity of grip geometry is achieved, and a grip may be accomplished at a pinch angle θP and a pinch width T_PINCH.

Figure 9:
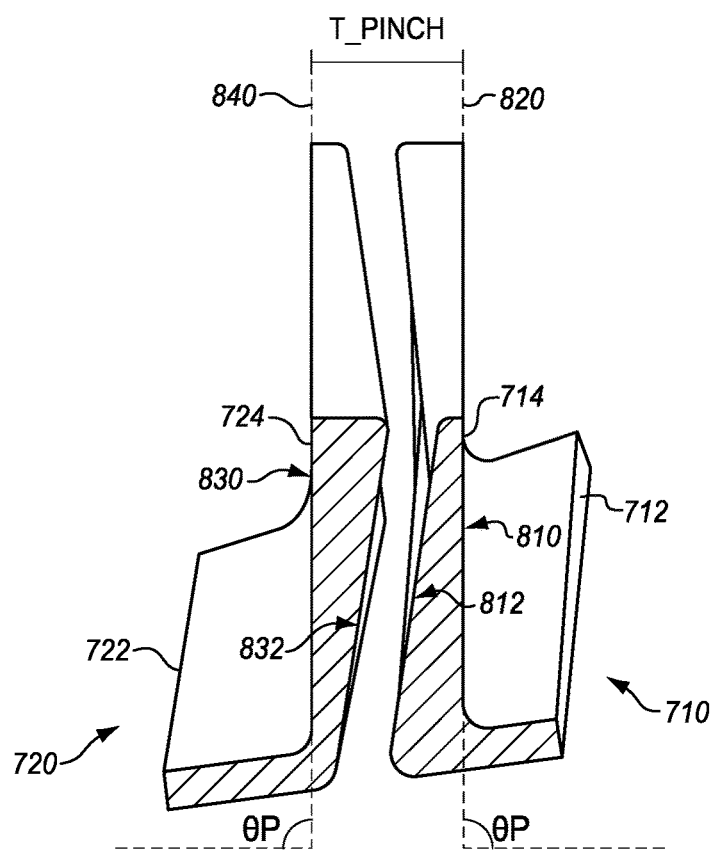
Figure 10:
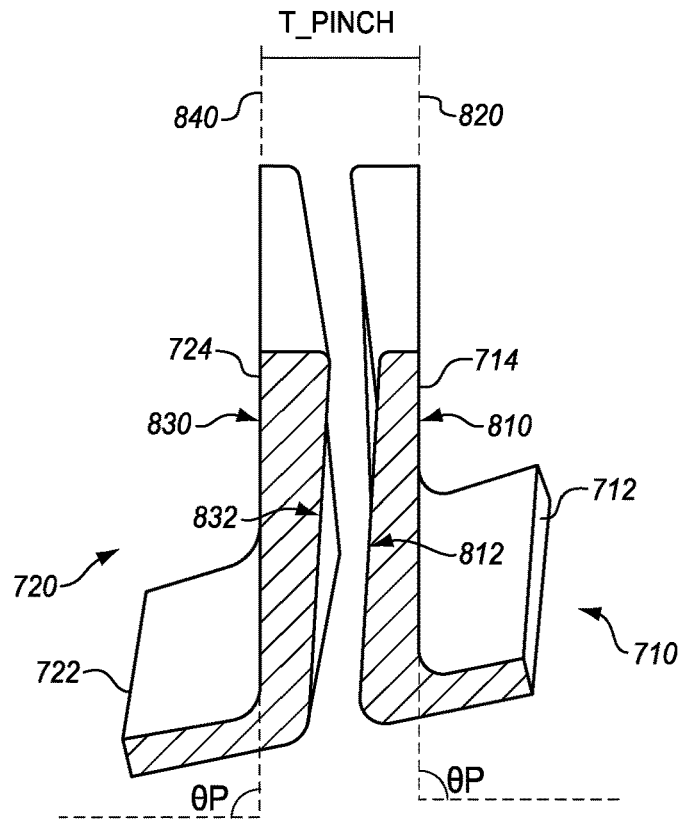
Figure 11:
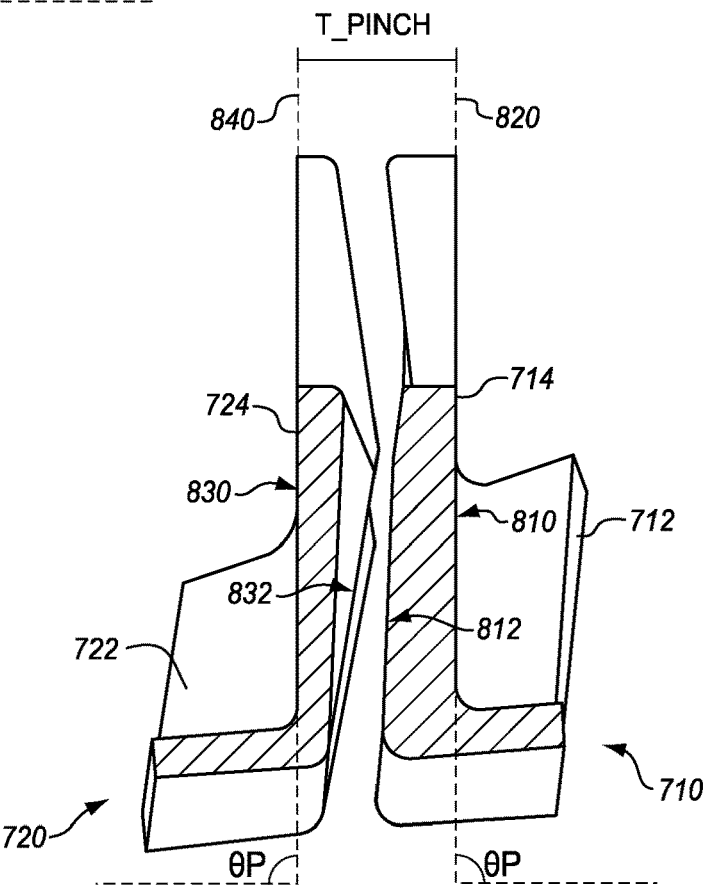

FIG. 9 corresponds with view arrows 9 of FIG. 7. As shown in FIG. 9, outer surfaces 810 and 830 of the caul plates continue to form the first plane 820 and the second plane 840, which are parallel to each other and remain constant throughout the entire length of the caul plates. This means that even though the angle of inner surfaces 812 and 832 may change based on the angle of a web of a stringer preform, uniformity of grip geometry is maintained. Hence, a grip may be accomplished at a pinch angle θP and a pinch width T_PINCH. FIG. 10 corresponds with view arrows 10 of FIG. 7, and illustrates that uniformity of grip geometry is still maintained in order to enable a grip to be accomplished at a pinch angle θP and a pinch width T_PINCH. FIG. 11 corresponds with view arrows 11 of FIG. 7, and illustrates similar features.

Figure 12:
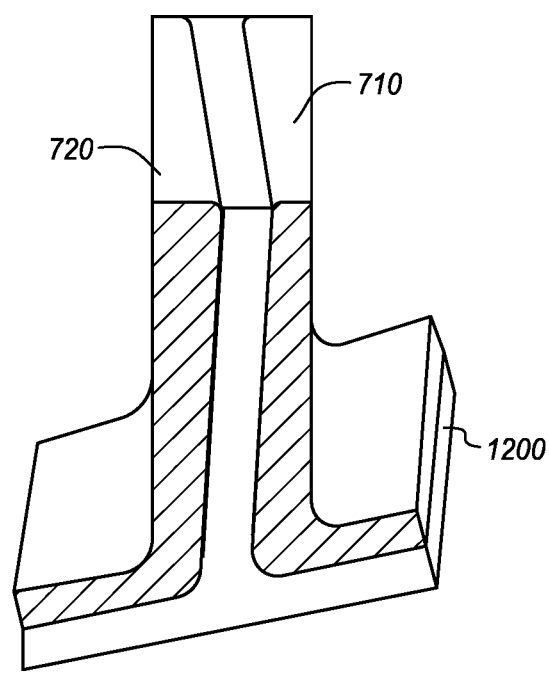
FIG. 12 is an end view of caul plates disposed at a preform in an illustrative embodiment.

FIG. 12 is an end view of caul plates disposed at a preform in an illustrative embodiment. As shown in FIG. 12, the caul plates 710 and 720 are complementary to the geometry of the stringer 1200, while exhibiting outer surfaces that define parallel planes for gripping the stringer and caul plates for pick and placement.

Figure 13:
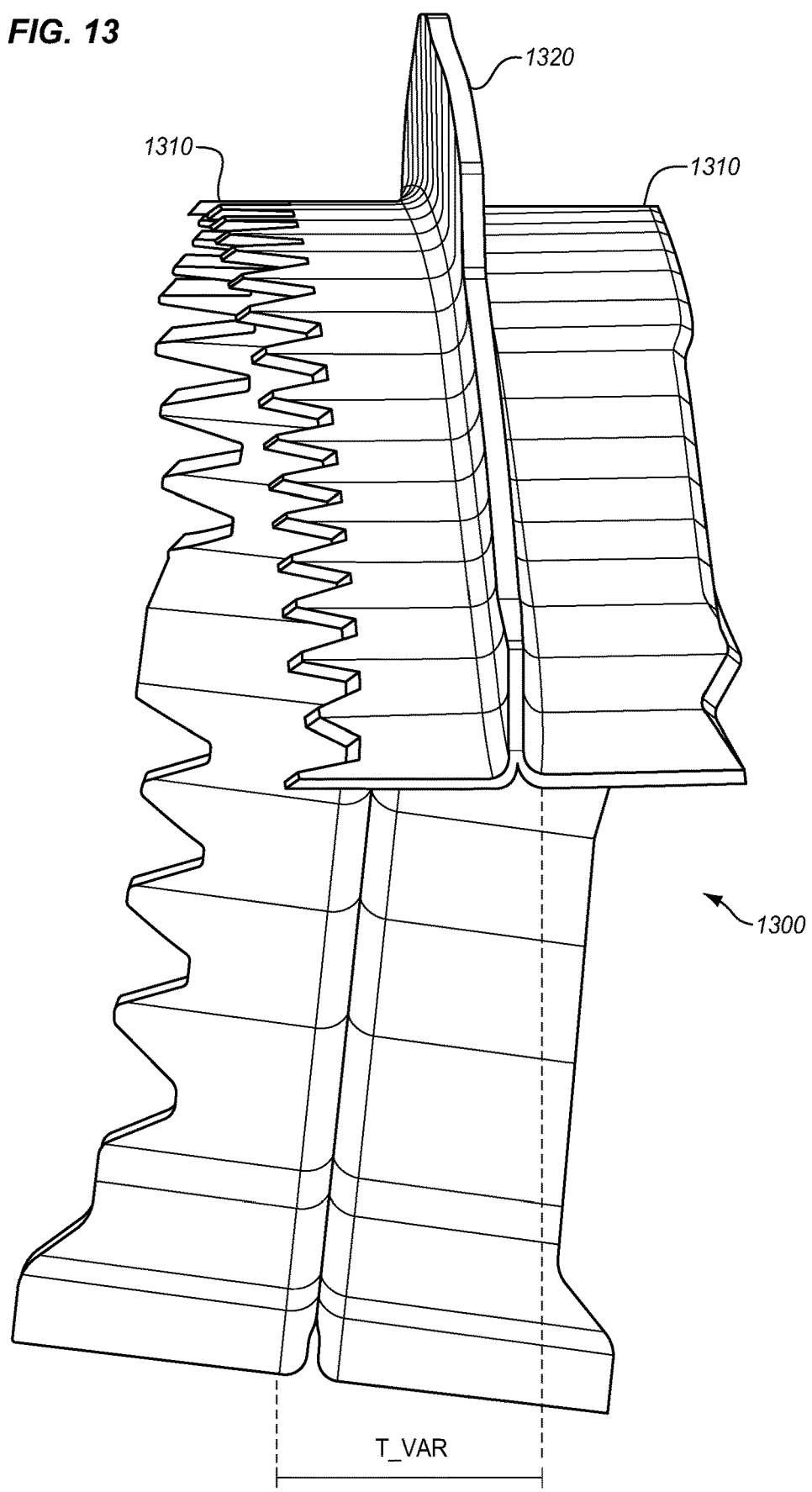
FIG. 13 is a perspective view of a further stringer preform for a wing in an illustrative embodiment.

FIG. 13 is a perspective view of a further stringer preform 1300 for a wing in an illustrative embodiment. The stringer preform 1300 may be utilized with the caul plates discussed above as desired. In this embodiment, the stringer preform includes flanges 1310 and web 1320, and a total variation in lateral position of the web 1320 along a horizontal axis is equal to T_VAR. In some embodiments, caul plates for the stringer preform 1300 are dimensioned to provide a T_PINCH equal to T_VAR plus an amount to accommodate the caul plates themselves. That is, a distance between the outer surface of a first caul plate and the outer surface of a second caul plate corresponds with a maximum distance between portions of the web 1320 along the length of the stringer preform 1300. This geometry for the caul plates eliminates the need for end effectors of a PNP machine to displace themselves laterally when performing PNP operations.

Illustrative details of the operation of the various caul plates and stringer preforms provided herein will be discussed with regard to FIG. 14. Assume, for this embodiment, that caul plates 710 and 720 have been fabricated and placed into caul plate storage. Further, assume that stringer preform 200 has been fully laid up, and awaits placement onto a wing preform.

Figure 14:
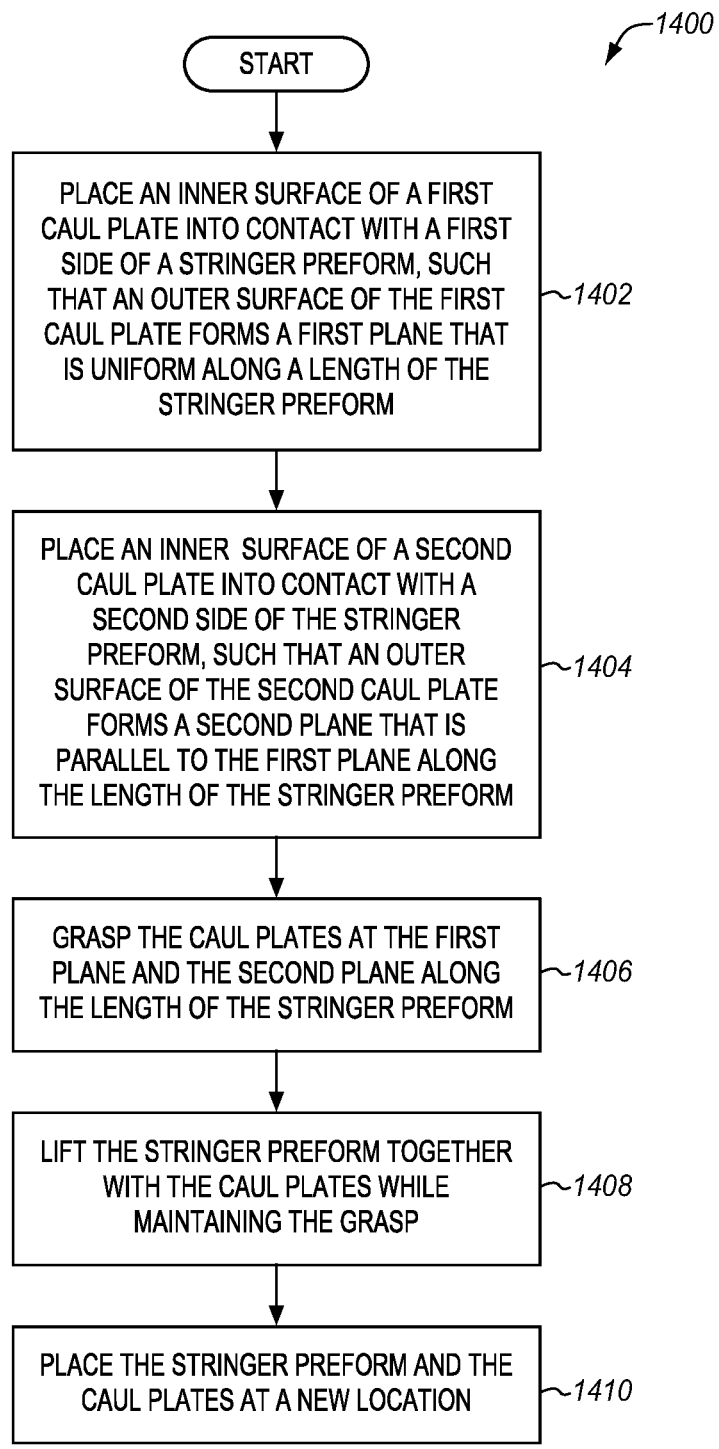
FIG. 14 is a flowchart illustrating a method for picking and placing a stringer preform in an illustrative embodiment.

FIG. 14 is a flowchart illustrating a method 1400 for picking and placing a preform in an illustrative embodiment. The steps of method 1400 are described with reference to the illustrative configurations and structures shown in the drawings discussed above, but those skilled in the art will appreciate that method 1400 may be performed in other systems. The steps of the flowcharts described herein are not all inclusive and may include other steps not shown. The steps described herein may also be performed in an alternative order.

In step 1402, end effectors 114 place an inner surface of a first caul plate (e.g., caul plate 710) into contact with a first side of a stringer preform, such that an outer surface of the first caul plate forms a first plane 820 that is uniform along a length of the stringer preform. In one embodiment, the inner surface 812 of caul plate 710 is placed into contact with a first side of the stringer preform 200 along the entire length of the stringer preform.

In step 1404, end effectors 114 place an inner surface of a second caul plate (e.g., caul plate 720) into contact with a second side of the stringer preform, such that an outer surface of the second caul plate forms a second plane 840 that is parallel to the first plane along a length of the stringer preform. In one embodiment, the inner surface 832 of caul plate 720 is placed into contact with a second side of the stringer preform 200 along the entire length of the stringer preform.

Step 1406 comprises grasping the caul plates at the first plane 820 and the second plane 840 along the length of the stringer preform. In one embodiment, grasping the caul plates is performed via multiple end effectors disposed along a length of the stringer preform. As a part of this process, in one embodiment each end effector 114 extends into position such that individual fingers bridge a distance between outer surfaces of the caul plates, and the fingers are then drawn together to form a physical grip of the caul plates. A suitable amount of pinching force is utilized by each end effector 114 in order to enable the stringer preform 200 to be carried between the caul plates when lifting occurs.

Step 1408 includes lifting the stringer preform together with the caul plates while maintaining the grasp. The caul plates maintain a shape of the stringer preform while the stringer preform is lifted by the PNP machine 112. The stringer preform and caul plates are then carried by the PNP machine 112 to a placement location 142 for receiving these components.

In one embodiment, the lifting operation is followed by placing the stringer preform and the caul plates at a new location in step 1410, such as by placing the stringer preform onto the wing panel preform 140. The stringer preform, together with other stringer preforms and the wing panel preform itself, are vacuum bagged. After vacuum bagging has been completed, the entire assembly of preforms is placed into an autoclave, and the stringer preform is hardened together with the wing panel preform while the caul plates enforce a shape onto the stringer preform. After the stringer preform has been hardened into a composite part, the caul plates are removed.

Method 1400 may provide a substantial advantage over prior systems and techniques, for example because it creates a uniform pair of planes which facilitate indexing and gripping of caul plates. This may reduce the complexity of pick and place operations, in turn potentially reducing associated maintenance, synchronization, and/or machinery costs. Furthermore, method 1400 may enable enhanced levels of production efficiency, for example because it utilizes caul plates (which will be applied regardless of PNP scheme) to facilitate PNP operations. By using common caul plates that simplify the operations of PNP end effectors, operations of caul plate placement and stringer placement onto panel may be combined into a single operation.

Figure 15:
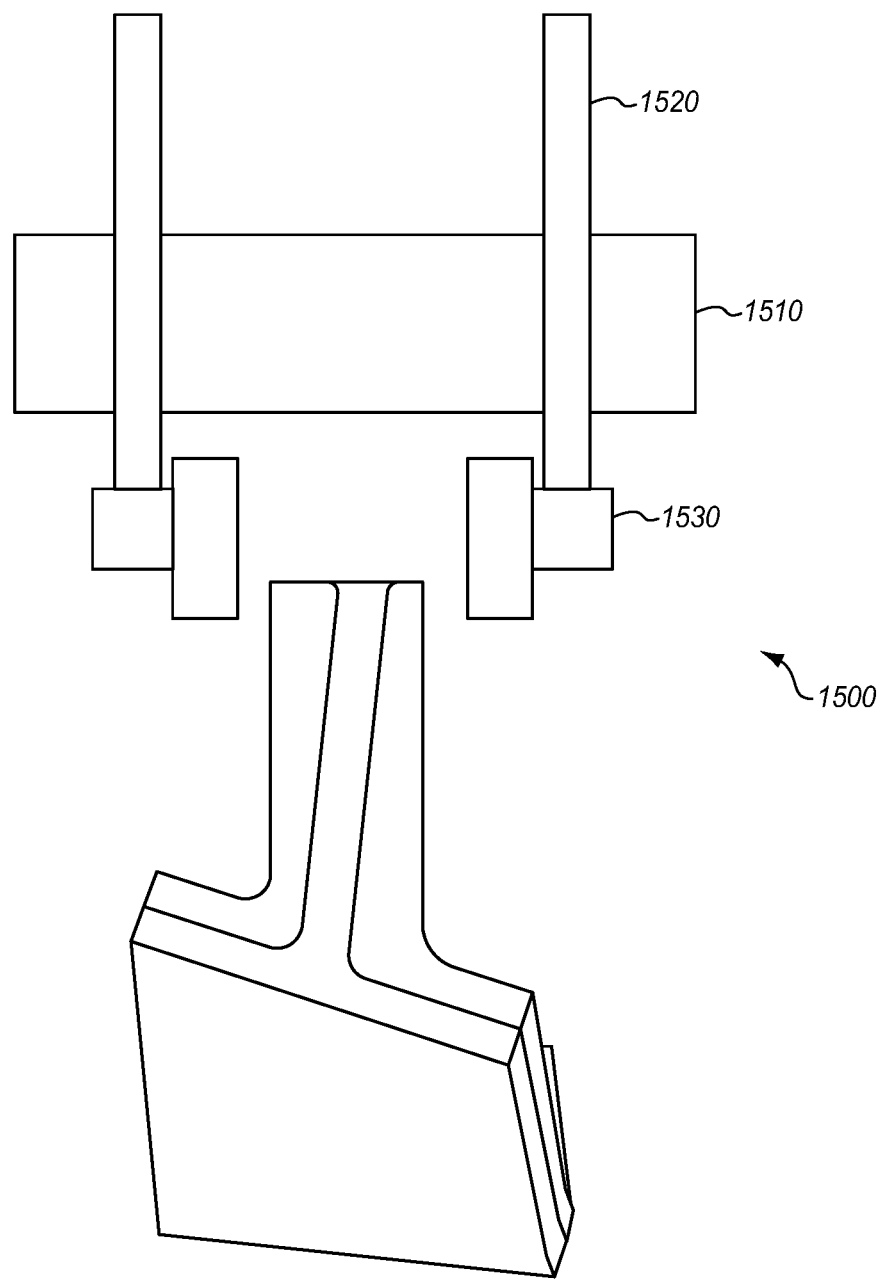
FIGS. 15-18 illustrate picking and placement of a stringer preform according to the method of FIG. 14 in an illustrative embodiment.
Figure 16:
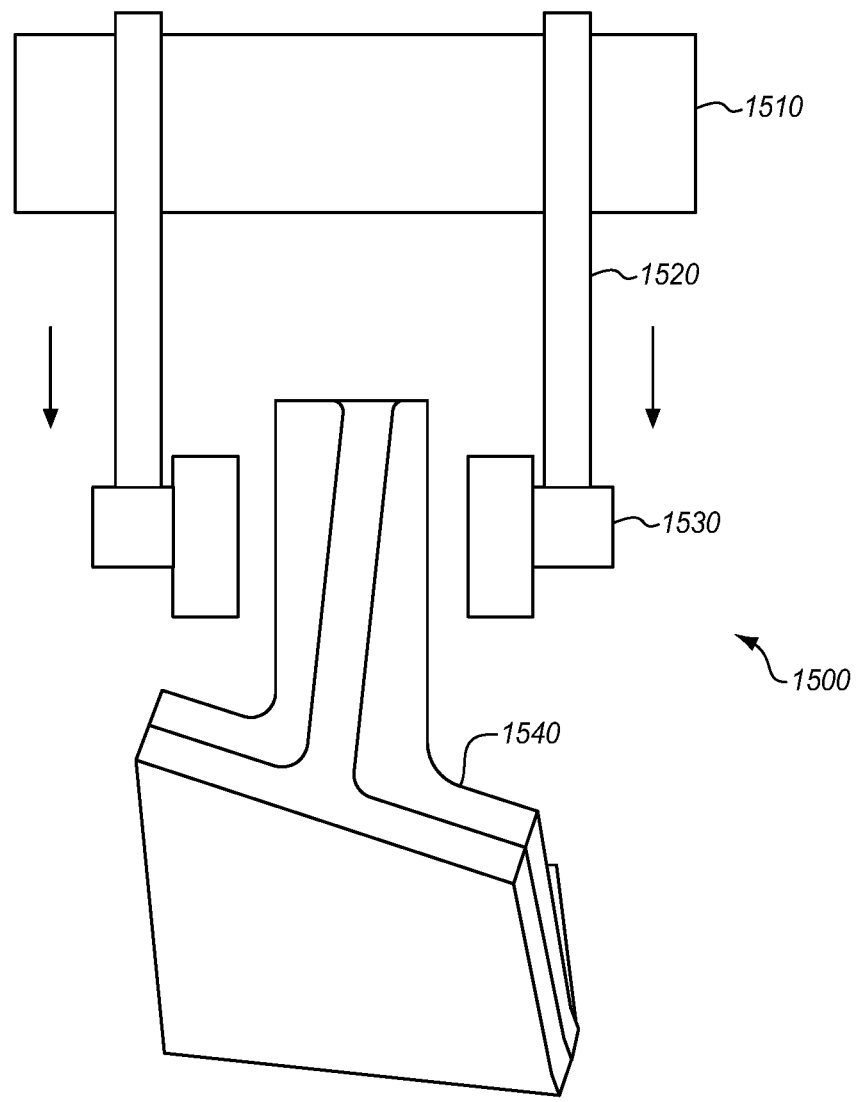

FIGS. 15-18 illustrate picking and placement of a stringer preform according to the method of FIG. 14 in an illustrative embodiment. In FIG. 15, an end effector 1500 comprising fingers 1520 and coupling features 1530 are poised at a PNP machine 1510 over a pair of caul plates 1540 that surround a stringer. In FIG. 16, the fingers 1520 are extended towards the caul plates 1540, and in FIG. 17, the fingers 1520 are pinched together. This draws coupling features 1530 into contact with the caul plates 1540. Because the caul plates 1540 enforce a constant geometry, end effectors along the entire length of the PNP machine 1510 (e.g., into and out of the page) apply grips at the same width and angle, although potentially at varying heights. This reduces the complexity of pick and place operations by constraining the number of rotations and/or translations that need to be supported by the end effectors 1500.

Figure 17:
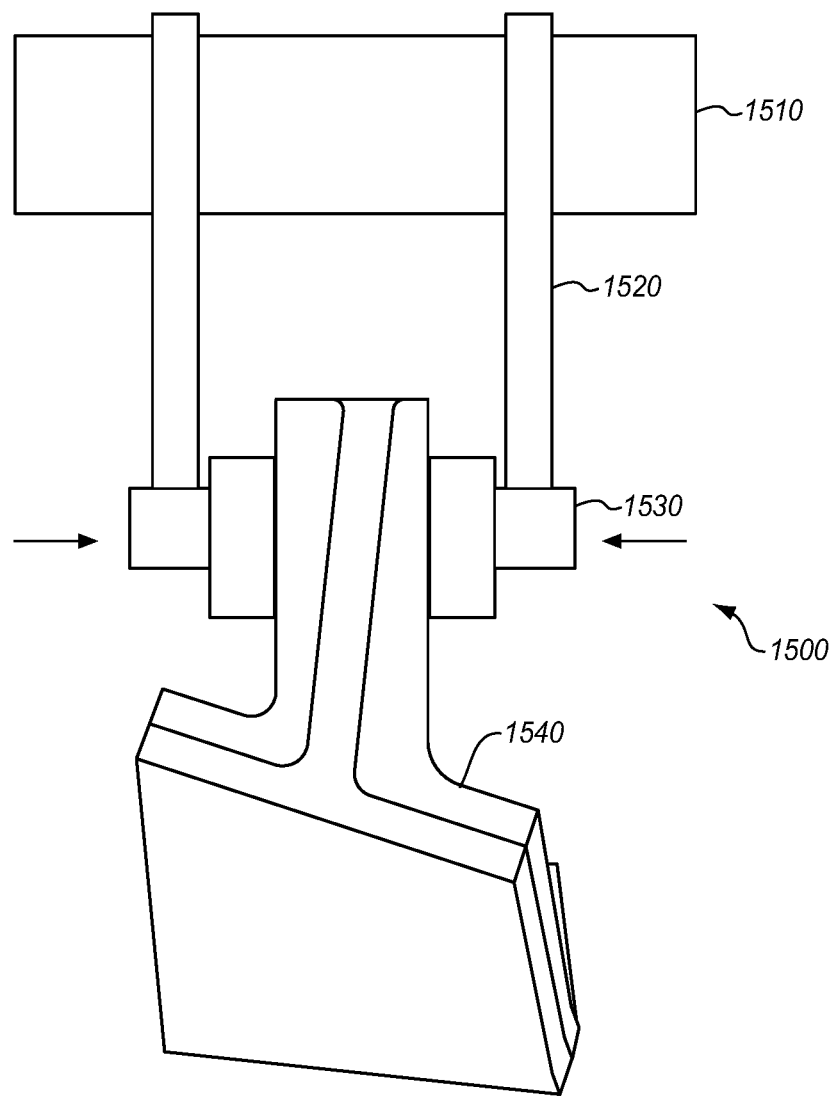
Figure 18:
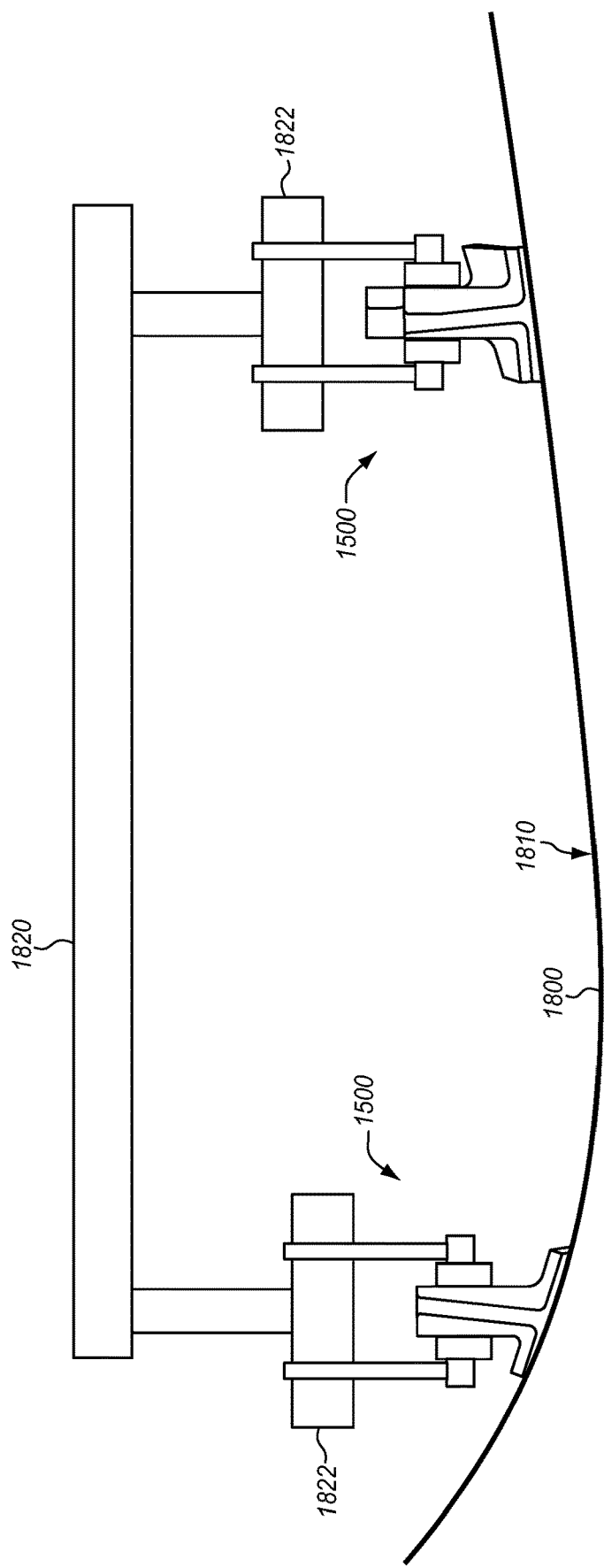

FIG. 18 further depicts the concepts illustrated in FIGS. 15-17, by depicting placement of multiple caul plates (one per stringer preform) onto a wing panel preform 1800 exhibiting a contour 1810. In this embodiment, picking and placing is performed via multiple PNP machines 1822 that move relative to a gantry 1820. Although the caul plates discussed above are shown as continuous structures, an alternative embodiment may take the form of multiple, discrete structures that provide a similar function. Thus, in some embodiments multiple caul plates are used during picking and placement of each of the stringer preforms.

Figure 19:
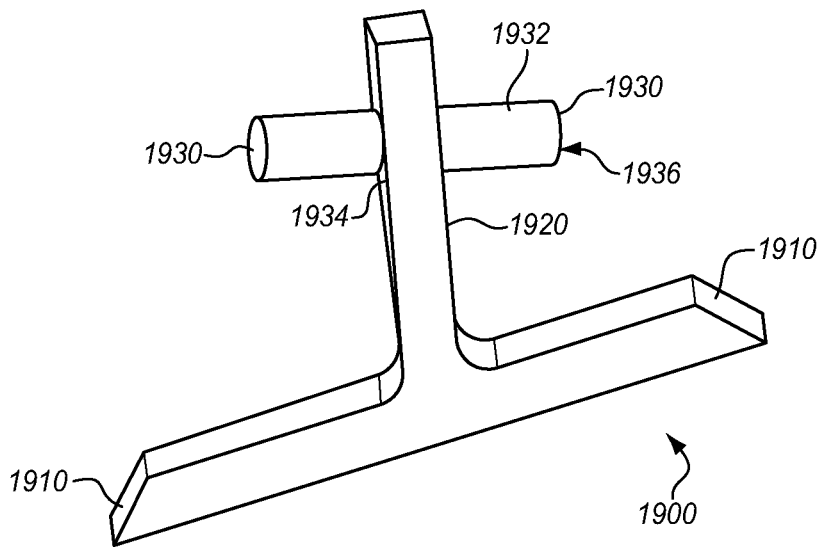
FIGS. 19-20 depict applied adapters that facilitate picking and placement of stringer preforms in an illustrative embodiment.
Figure 20:
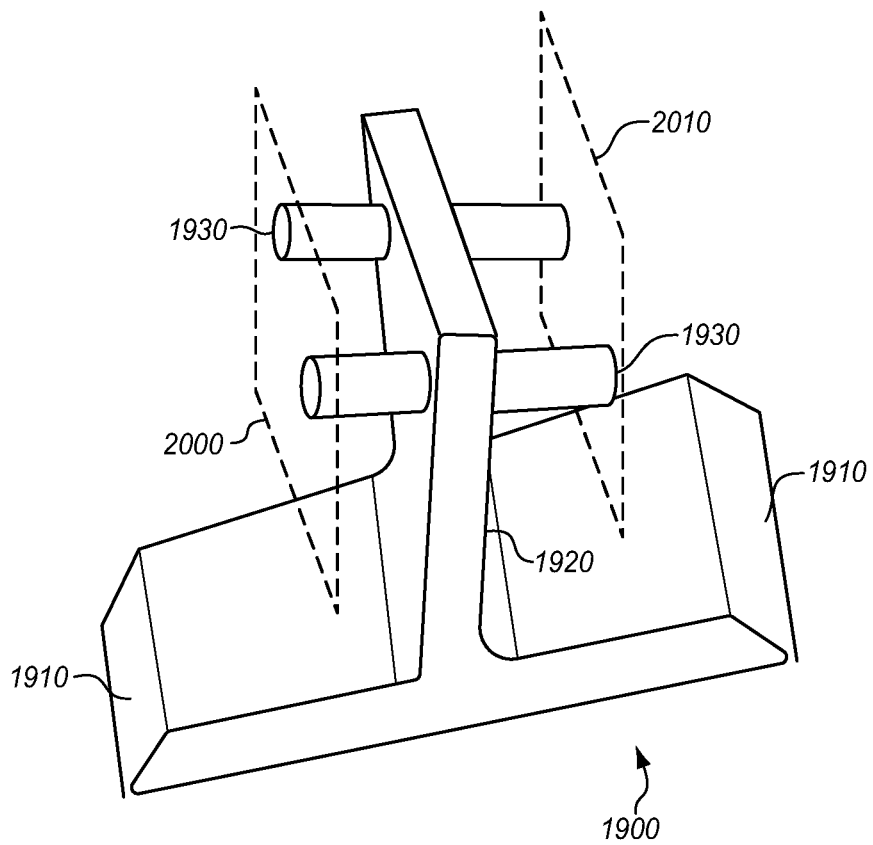

FIGS. 19-20 depict adapters that are applied to a stringer preform and that facilitate picking and placement of the stringer preform in an illustrative embodiment. The adapters 1930 are placed in series along a length of a stringer preform 1900, on the left side and the right side. The adapters 1930 may be glued in place, punched through the stringer preform 1900, or otherwise coupled with the stringer preform 1900. In this embodiment, the adapters 1930 are arranged along a web 1920 of the stringer preform 1900, although in further embodiments the adapters are disposed at the flanges 1910 of the stringer preform 1900. Each adapter 1930 includes a body 1932 that defines an inner surface 1934 that is complementary to a first side of the stringer preform defined by a first flange and a web of the stringer preform. The body 1932 of each adapter on the left side defines an outer surface 1936 that is coincident with a plane 2000, while the body 1932 of each adapter on the right side defines an outer surface 1936 that is coincident with a plane 2010. In further embodiments, the adapters are made integral with caul plates covering the stringer preform 1900. Thus, caul plates are an example of a type of adapter that may be utilized.

The caul plates and adapters discussed above may be fabricated in any suitable way, using any suitable materials. For example, in an illustrative method, caul plates may be formed on a stringer preform, or an object such as a mandrel having the physical configuration of a stringer preform. The caul plates may then be hardened (e.g., cured) after forming in order to become rigid.

Figure 21:
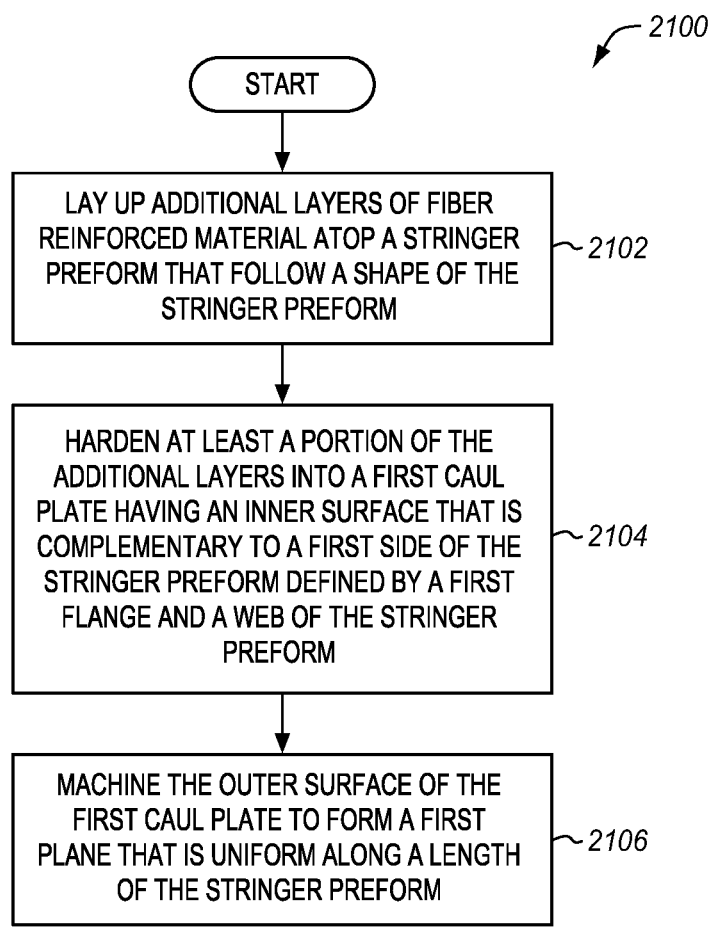
FIG. 21 is a flowchart illustrating a method for fabricating caul plates for a stringer preform in an illustrative embodiment.

FIG. 21 is a flowchart illustrating a method 2100 for fabricating caul plates for a stringer preform in an illustrative embodiment. Step 2102 comprises laying up additional layers of fiber reinforced material atop a stringer preform that follow a shape of the stringer preform. In one embodiment, the additional layers comprise between six and twenty-four plies of fiber reinforced material, and the additional layers are separated from the stringer preform by at least one release layer.

Step 2104 comprises hardening at least a portion of the additional layers into a first caul plate having an inner surface that is complementary to a first side of the stringer preform defined by a first flange and a web of the stringer preform, and having an outer surface.

Step 2106 comprises machining the outer surface of the first caul plate to form a first plane that is uniform along a length of the stringer preform. In one embodiment, machining the outer surface comprises trimming the outer surface.

Machining the outer surface results in the caul plate having a varying thickness, which enables the caul plate to accommodate changes in web geometry while maintaining a uniform outer plane for pick and placement.

After the caul plate has been fabricated, it is placed onto a stringer preform along with one or more other caul plates, and the stringer preform is picked, placed, and hardened into a composite part.

In further embodiments, method 2100 further includes hardening at least a portion of the additional layers into a second caul plate having an inner surface that is complementary to a second side of the stringer preform defined by a second flange and the web of the stringer preform, the second caul plate further having an outer surface, and machining the outer surface of the second caul plate to form a second plane that is parallel with the outer surface of the first caul plate along a length of the stringer preform.

Figure 22:
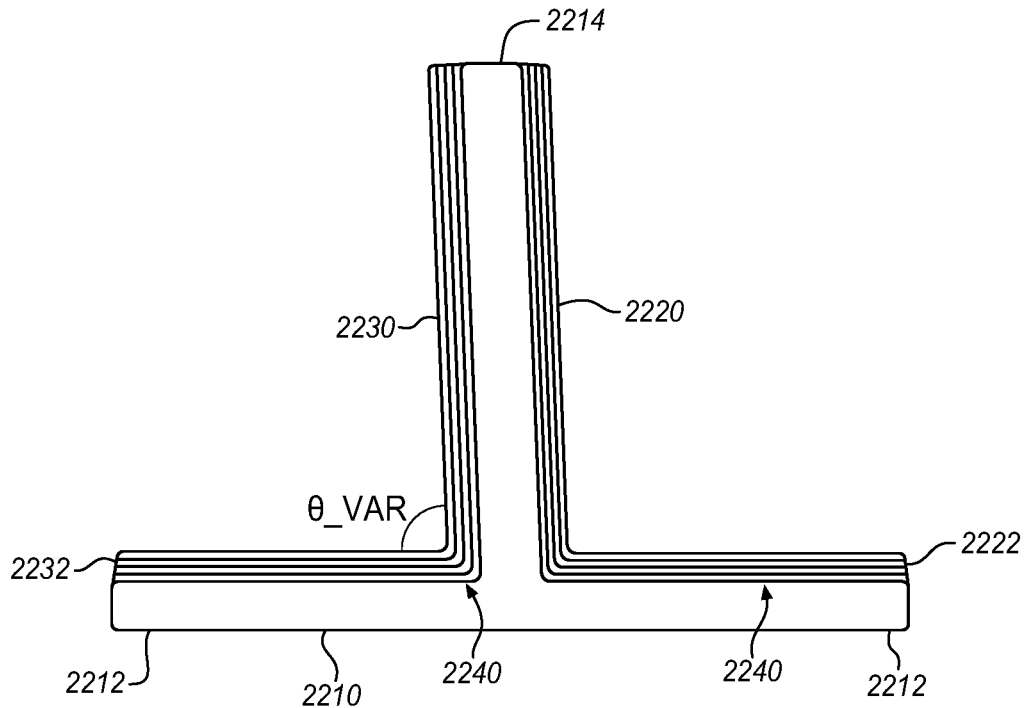
FIGS. 22-23 depict fabrication of caul plates from a stringer preform in an illustrative embodiment.
Figure 23:
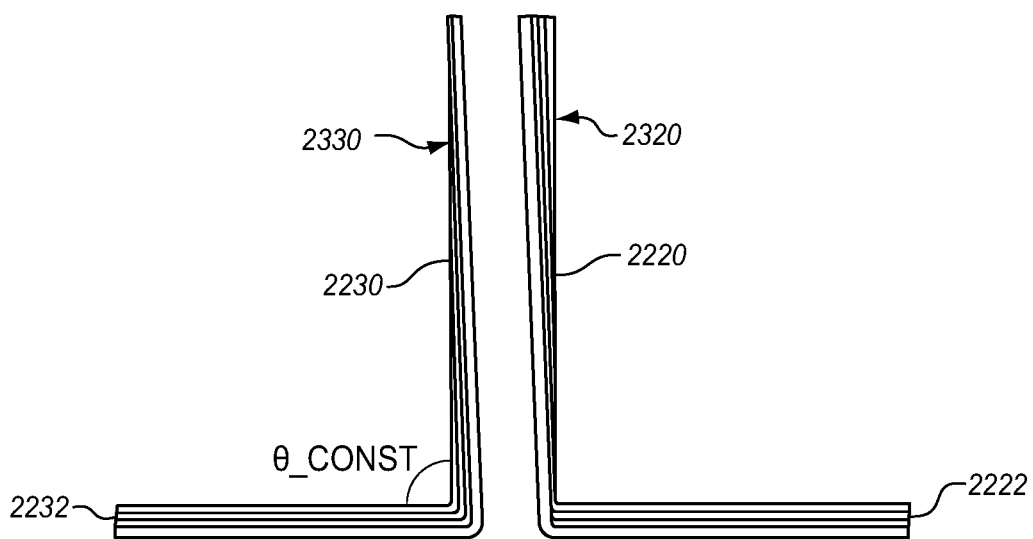

FIGS. 22-23 depict fabrication of caul plates from a stringer preform in an illustrative embodiment. In FIG. 22, the caul plates are laid-up as additional layers atop a stringer preform 2210. In this embodiment, the stringer preform 2210 includes flanges 2212 as well as web 2214. A first caul plate 2220 is made from additional layers 2222 placed atop one or more release layers 2240. In a similar fashion, a second caul plate 2230 is made from additional layers 2232 placed atop one or more release layers 2240. Because the layup process for the caul plates is performed directly atop the stringer preform, the caul plates as laid-up exhibit a varying pinch angle θ_VAR along the length of the caul plates into and out of the page. After the caul plates are removed and hardened (e.g., via an autoclave), the caul plates are machined (e.g., trimmed). This machining operation removes material, and forms outer surface 2320 and outer surface 2330, which define parallel planes along the length of the caul plates. This results in a constant pinch angle θ_VAR along the entire length of the caul plates into and out of the page.

EXAMPLES

In the following examples, additional processes, systems, and methods are described in the context of fabrication and use of caul plates and stringers.

Figure 24:
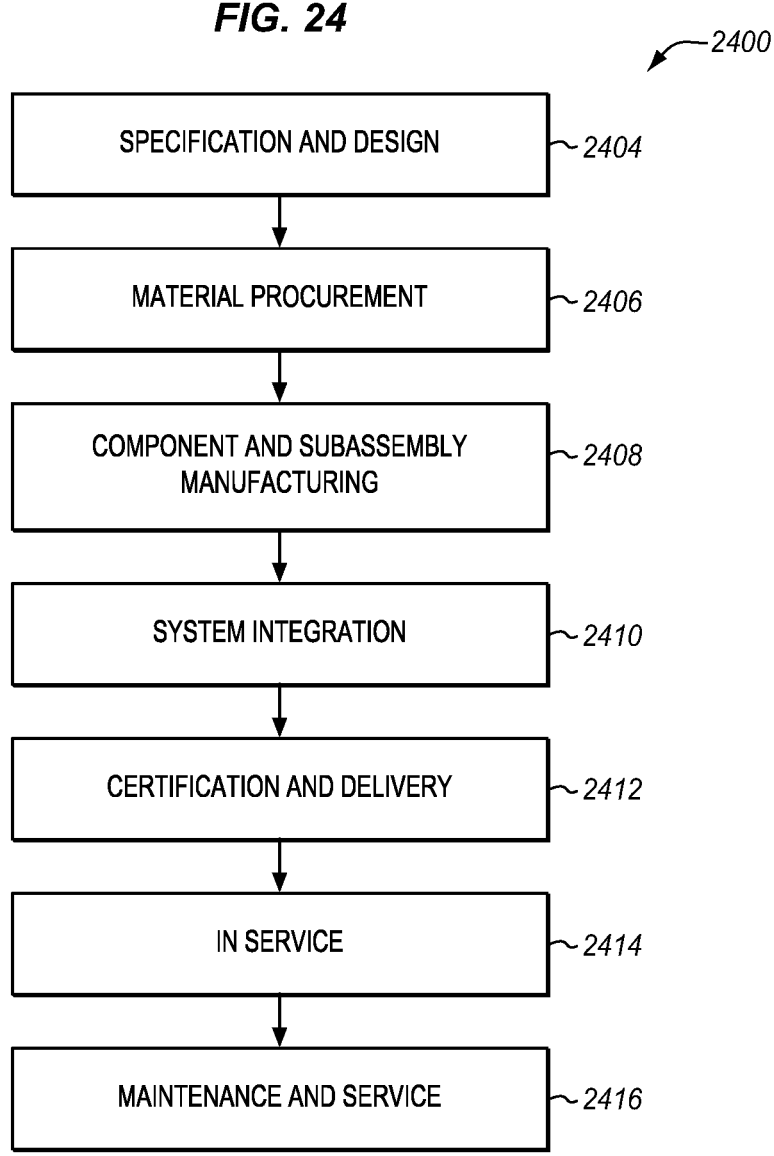
FIG. 24 is a flow diagram of aircraft production and service methodology in an illustrative embodiment.
Figure 25:
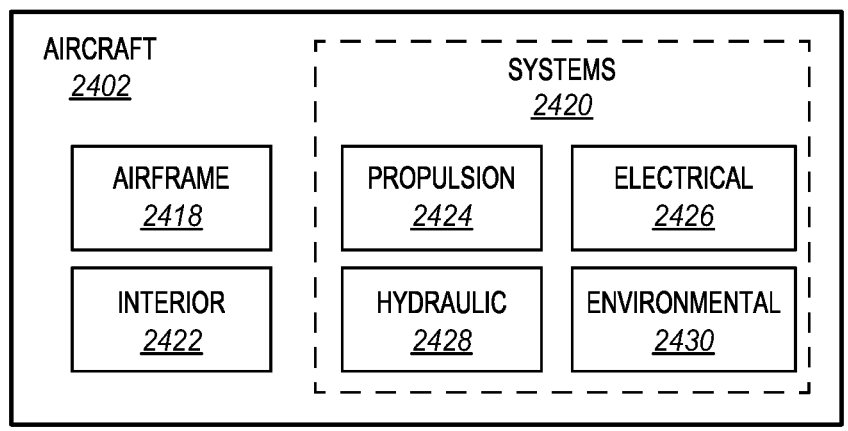
FIG. 25 is a block diagram of an aircraft in an illustrative embodiment.

Referring more particularly to the drawings, embodiments of the disclosure may be described in the context of aircraft manufacturing and service in method 2400 as shown in FIG. 24 and an aircraft 2402 as shown in FIG. 25. During pre-production, method 2400 may include specification and design 2404 of the aircraft 2402 and material procurement 2406. During production, component and subassembly manufacturing 2408 and system integration 2410 of the aircraft 2402 takes place. Thereafter, the aircraft 2402 may go through certification and delivery 2412 in order to be placed in service 2414. While in service by a customer, the aircraft 2402 is scheduled for routine work in maintenance and service 2416 (which may also include modification, reconfiguration, refurbishment, and so on). Apparatus and methods embodied herein may be employed during any one or more suitable stages of the production and service described in method 2400 (e.g., specification and design 2404, material procurement 2406, component and subassembly manufacturing 2408, system integration 2410, certification and delivery 2412, service 2414, maintenance and service 2416) and/or any suitable component of aircraft 2402 (e.g., airframe 2418, systems 2420, interior 2422, propulsion system 2424, electrical system 2426, hydraulic system 2428, environmental 2430).

Each of the processes of method 2400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 25, the aircraft 2402 produced by method 2400 may include an airframe 2418 with a plurality of systems 2420 and an interior 2422. Examples of systems 2420 include one or more of a propulsion system 2424, an electrical system 2426, a hydraulic system 2428, and an environmental system 2430. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 2400. For example, components or subassemblies corresponding to component and subassembly manufacturing 2408 may be fabricated or manufactured in a manner similar to components or subassemblies produced while the aircraft 2402 is in service. Also, one or more apparatus embodiments, method embodiments, or a combination thereof may be utilized during the subassembly manufacturing 2408 and system integration 2410, for example, by substantially expediting assembly of or reducing the cost of an aircraft 2402. Similarly, one or more of apparatus embodiments, method embodiments, or a combination thereof may be utilized while the aircraft 2402 is in service, for example and without limitation during the maintenance and service 2416. Thus, the invention may be used in any stages discussed herein, or any combination thereof, such as specification and design 2404, material procurement 2406, component and subassembly manufacturing 2408, system integration 2410, certification and delivery 2412, service 2414, maintenance and service 2416 and/or any suitable component of aircraft 2402 (e.g., airframe 2418, systems 2420, interior 2422, propulsion system 2424, electrical system 2426, hydraulic system 2428, and/or environmental 2430).

In one embodiment, a part comprises a portion of airframe 2418, and is manufactured during component and subassembly manufacturing 2408. The part may then be assembled into an aircraft in system integration 2410, and then be utilized in service 2414 until wear renders the part unusable. Then, in maintenance and service 2416, the part may be discarded and replaced with a newly manufactured part. Inventive components and methods may be utilized throughout component and subassembly manufacturing 2408 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof

What is claimed is:

1. A system comprising:
a first caul plate and a second caul plate configured for a stringer preform that includes a web and flanges;
the first caul plate comprising a body defining:
an outer surface that forms a first plane that is uniform along a length of the stringer preform; and
an inner surface complementary to a first side of the stringer preform such that an angle of the inner surface of the first caul plate in relation to the outer surface of the first caul plate changes with an angle of the web along the length of the stringer preform; and
the second caul plate comprising a body defining:
an outer surface that forms a second plane that is uniform along the length of the stringer preform and parallel to the first plane; and
an inner surface complementary to a second side of the stringer preform such that an angle of the inner surface of the second caul plate in relation to the outer surface of the second caul plate changes with the angle of the web along the length of the stringer preform.

2. The system of claim 1, further comprising:
end effectors configured to grasp the caul plates at the first plane and the second plane, and lift the stringer preform together with the caul plates while maintaining the grasp.

3. The system of claim 2, wherein:
the end effectors are configured to grasp the caul plates with the inner surface of the first caul plate placed into contact with the web and a first flange on the first side of the stringer preform and the inner surface of the second caul plate placed into contact with the web and a second flange on the second side of the stringer preform.

4. The system of claim 2, wherein:
the end effectors are configured to grasp the caul plates at a uniform pinch angle and thickness.

5. The system of claim 2, further comprising:
a pick and place machine configured to operate the end effectors to transport the stringer preform and the caul plates to another location.

6. The system of claim 5, wherein:
the caul plates enforce a shape onto the stringer preform during transport.

7. The system of claim 5, wherein:
the other location comprises a placement location on a wing panel preform.

8. The system of claim 1, wherein:
the second plane is separated from the first plane by a uniform distance along the length of the stringer preform.

9. The system of claim 1, wherein:
the inner surfaces of the first caul plate and the second caul plate change orientation along the length of the stringer preform, while the outer surfaces of the first caul plate and the second caul plate maintain the same orientation.

10. The system of claim 1, wherein:
the first caul plate and the second caul plate exhibit a non-uniform thickness.

11. The system of claim 1, wherein:
a distance between the outer surface of the first caul plate and the outer surface of the second caul plate corresponds with a maximum distance between portions of the web along the length of the stringer preform.

12. The system of claim 1, wherein:
the stringer preform is for a portion of a wing of an aircraft.

13. A system comprising:
a pair of caul plates configured for a stringer preform that includes a web and flanges, wherein the pair comprises:
a first caul plate comprising:
a first outer surface that forms a first exterior plane; and
a first inner surface complementary to a first side of the stringer preform such that an angle of the first inner surface in relation to the first outer surface changes with an angle of the web along a length of the stringer preform; and
a second caul plate comprising:
a second outer surface that forms a second exterior plane parallel to the first exterior plane; and
a second inner surface complementary to a second side of the stringer preform such that an angle of the second inner surface in relation to the second outer surface changes with the angle of the web along the length of the stringer preform.

14. The system of claim 13, further comprising:
end effectors configured to grasp the caul plates at the first exterior plane and the second exterior plane, and lift the stringer preform together with the caul plates while maintaining the grasp.

15. The system of claim 14, wherein:
the end effectors are configured to grasp the caul plates at a uniform pinch angle and thickness.

16. The system of claim 14, further comprising:
a pick and place machine configured to operate the end effectors to transport the stringer preform and the caul plates to another location.

17. The system of claim 16, wherein:
the caul plates enforce a shape onto the stringer preform during transport.

18. The system of claim 13, wherein:
the first exterior plane and the second exterior plane are separated by a constant distance along the length of the stringer preform, while thicknesses of the first caul plate and the second caul plate vary along the length of the stringer preform.

19. The system of claim 13, wherein:
the first inner surface and the second inner surface change orientation along the length of the stringer preform, while the first outer surface and the second outer surface maintain the same orientation.

20. A system comprising:
caul plates configured for a stringer preform that includes a web and flanges;
wherein a first caul plate of the caul plates comprises a first inner surface and a first outer surface, wherein the first inner surface is complementary to a first side of the stringer preform such that an angle of the first inner surface changes in relation to the first outer surface to accommodate changes in an angle of the web along a length of the stringer preform;
wherein a second caul plate of the caul plates comprises a second inner surface and a second outer surface, wherein the second inner surface is complementary to a second side of the stringer preform such that an angle of the second inner surface changes in relation to the second outer surface to accommodate the changes in the angle of the web;
wherein the first outer surface and the second outer surface form parallel planes along a length of the caul plates.

* * * * *